United States Patent
Colwell et al.

(10) Patent No.: US 10,178,569 B1
(45) Date of Patent: Jan. 8, 2019

(54) ADAPTIVE APPLICATION BEHAVIOR BASED ON ASSESSED NETWORK CHARACTERISTICS

(71) Applicant: HEADSPIN, INC., Mountain View, CA (US)

(72) Inventors: Brien Colwell, Redwood City, CA (US); Manish Lachwani, Los Altos, CA (US)

(73) Assignee: HEADSPIN, INC., Mountain View, CA (US)

( * ) Notice: Subject to any disclaimer, the term of this patent is extended or adjusted under 35 U.S.C. 154(b) by 0 days.

(21) Appl. No.: 15/439,755

(22) Filed: Feb. 22, 2017

Related U.S. Application Data

(60) Provisional application No. 62/298,820, filed on Feb. 23, 2016.

(51) Int. Cl.
*H04W 24/08* (2009.01)
*H04L 12/26* (2006.01)
*H04W 4/50* (2018.01)

(52) U.S. Cl.
CPC ......... *H04W 24/08* (2013.01); *H04L 43/0882* (2013.01); *H04L 43/0888* (2013.01); *H04W 4/50* (2018.02)

(58) Field of Classification Search
CPC ....... H04W 28/14; H04W 4/18; H04W 76/10; H04L 67/325; H04L 67/2838; H04L 67/2876; H04L 41/0681; H04L 43/0876; H04L 43/16; H04L 43/50; H04L 1/242; H04L 1/244; H04L 12/26; H04L 12/2697; G06F 11/3409; G06F 11/3495; G06F 2201/865; H04J 2203/0062; H04Q 11/045; H04Q 1/20
See application file for complete search history.

(56) References Cited

U.S. PATENT DOCUMENTS

| | | | |
|---|---|---|---|
| 2010/0094990 A1* | 4/2010 | Ben-Yehuda | G06F 11/3409 709/224 |
| 2012/0158908 A1* | 6/2012 | Luna | H04W 28/14 709/217 |

* cited by examiner

*Primary Examiner* — Jung Liu
(74) *Attorney, Agent, or Firm* — Lindauer Law, PLLC

(57) ABSTRACT

Mobile devices executing applications utilize data services worldwide. Data may be acquired at a mobile computing device during communication. Over relatively short time scales differences in the data may be determined. Based on the differences, output data may be generated that is indicative of one or more particular network characteristics, such as bandwidth, latency, transmit power, received signal strength, and so forth. The output data may then be used to change the behavior of one or more of an application executing on the mobile computing device or a service executing on server that is in communication with the mobile computing device. For example, output data may be used as input to selection nodes associated with the application or service.

20 Claims, 4 Drawing Sheets

ADAPTIVE APPLICATION BEHAVIOR BASED ON ASSESSED NETWORK CHARACTERISTICS

PRIORITY

This application claims priority to U.S. Provisional Patent Application Ser. No. 62/298,820 filed on Feb. 23, 2016, titled "ADAPTIVE APPLICATION BEHAVIOR BASED ON ASSESSED NETWORK CHARACTERISTICS", the contents of which are incorporated by reference into the present disclosure.

INCORPORATION BY REFERENCE

U.S. patent application Ser. No. 14/850,798 filed Sep. 10, 2015, and titled "System for Application Test" is hereby incorporated by reference in its entirety.

U.S. patent application Ser. No. 14/976,480 filed Dec. 21, 2015, and titled "System for Network Characteristic Assessment" is hereby incorporated by reference in its entirety.

BACKGROUND

Mobile devices executing applications that utilize networks during operation to transfer data may experience failures or otherwise produce adverse user experiences as a result of network conditions. Gathering information at the mobile device about characteristics of the network may be useful to prevent or mitigate the impacts of failures.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
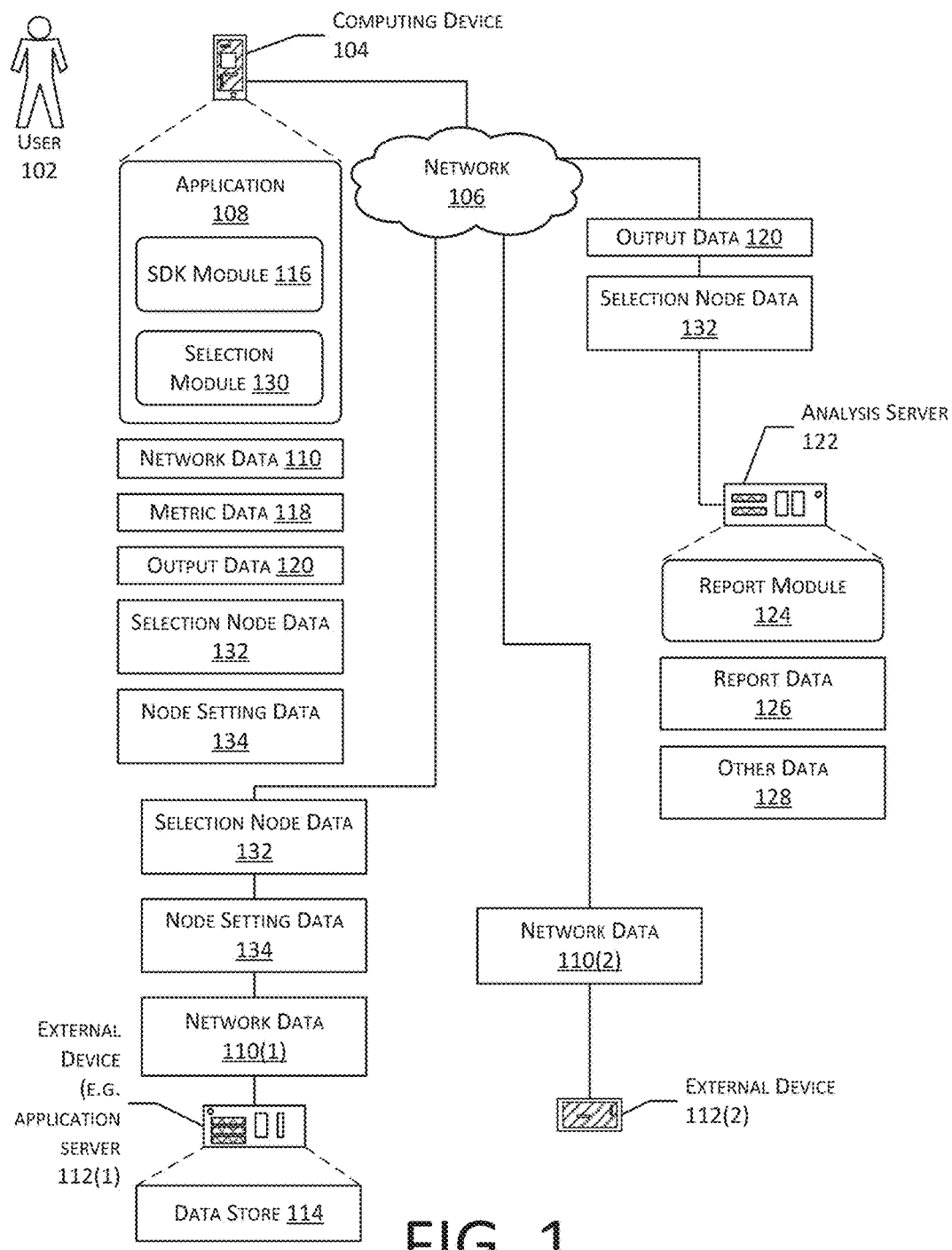
FIG. 1 depicts a system for network characteristic assessment and the generation of output data, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Computing devices may execute an application to provide various functions. These computing devices may include, but are not limited to, smartphones, laptops, tablet computers, embedded devices, wearable computing devices, appliances, automobiles, aircraft, and so forth. Functions provided by the application may involve retrieval of data, presentation of that data to a user, processing of data, and so forth.

Some applications may communicate with one or more external devices, such as a server, using a network. For example, a navigation application may use the network to send location information to an application server that is indicative of a position of a mobile device and receive map data to present on a display of the mobile device. Problems with this communication may result in the application failing to perform the desired function, error messages, improper operation, and so forth. Continuing the example above, a long latency or delay in receiving the map data may cause the application on the mobile device to pause, present an error to the user, and so forth. These problems may result in an adverse user experience. For example, the user may discontinue using the application because of these problems.

Some problems that the application may encounter while using the network may not be immediately perceived by the user. For example, the application may drain the battery of the mobile device more quickly by resending data due to communication problems with the network. The application may continue to operate, but the battery life may be reduced.

The network used by the computing device to access the external device may include a wireless wide area network (WWAN), such as a wireless cellular data network (WCDN). For example, the mobile device may comprise a smartphone that accesses a WCDN provided by a telecommunication company. By using the WCDN, the smartphone is able to send and receive data to other devices, such as those accessible on the Internet.

Performance of the network used by the computing device executing the application may be variable due to many factors. These factors may include the geographic location (geolocation) of where the computing device is located while communicating with the network, the network access point in use, congestion at the network access point, congestion at the interconnect that connects the WCDN to another network such as the Internet, capability of the network access point, and so forth. For example, during a morning commute, many users may be streaming video content to their mobile devices, resulting in overall network congestion. In another example, the telecommunication company may have some network access points that support 3G data transmission and are relatively more congested while other network access points are able to support 4G data transmission and are relatively less congested.

Network characteristics may include information associated with the transfer of data using the network. The network characteristics may include, but are not limited to, bandwidth, latency, number of packets sent, packet loss, transmit power, received signal strength, jitter, and so forth. The network characteristics for a particular connection between a network access point and a communication interface of a computing device may be available locally, but may be difficult or impossible to provide to a developer or other entity associated with maintaining the application or the computing device. The communication interface includes a radio to send and receive wireless signals. But in many situations information about operation of the radio may be unavailable to other portions of the computing device or other attached equipment. For example, equipment at the cell site may have information about packet loss for a particular connection, but that data may only be accessible by a technician who is physically connected to that radio. In another example, the radio in the communication interface may be secured such that only very limited information about the connection is sent to other components of the computing device. As a result, the operating system and the application of the computing device may have little or no information about operation of the radio attached to the computing device.

Operation of an application executing on the computing device, development of the application, or other situations may be adapted based on network characteristics that are observed. Output data may be generated that provides information about a computing device or the operation thereof. The output data may be indicative of one or more network characteristics associated with the transfer of data between a network and the computing device (such as a mobile device). In one implementation, the techniques described herein may be implemented using a software development kit (SDK) that may be incorporated into or otherwise associated with an application. For example, the SDK may be compiled into an application by a developer.

During operation, the application may send network data to external devices using the network. For example, the network data may include requests for data, responses to those requests, commands, status information, and so forth. The network data may include data that is transferred during the normal course of operation and is not solely for the purpose of diagnostic testing.

The SDK may include a SDK module to generate metric data. The metric data comprises information indicative of operation of the computing device. In some implementations, the metric data may be indicative of one or more network characteristics. The metric data may be generated in a passive fashion, that is without explicitly triggering the send or receive of data. For example, the SDK may generate metric data responsive to the transfer of the network data, rather than initiating a transfer of data. In this respect, the operation of the SDK module may be considered passive in that it may operate to generate metric data without influencing the flow of network data or sending special data.

The SDK module may include or access one or more counters, each counter associated with a different network characteristic. For example, a counter may measure a number of packets sent per unit of time. The counter may acquire data at one or more of an application level, operating system level, or hardware level of the communication interface.

A rate of data collection of the metric data may be adjusted over time. At a first time, a first data collection rate may be used, while at a second time, a second data collection rate greater than the first data collection rate may be used. For example, the first data collection rate may be to sample a counter 10 times per second and store those samples or information based on the samples as the metric data. The values of the metric data may be processed to generate output data. For example, first metric data up to a first time may be binned and first histogram data generated. First percentile values may be determined from the first histogram data. Values of second metric data may be acquired later, may be binned, second histogram data generated, and then second percentile values determined. Comparison data indicative of a difference between the first percentile values and the second percentile values may be determined. If the difference of the comparison data exceeds a threshold value, output data indicative of an event may be stored.

In some implementations, upon detection of an event, the data collection rate may be changed. For example, output data indicative of an increase in transmission of network data may result in a transition to the second data collection rate. For example, the second data collection rate may be to sample the counter 1000 times per second. Output data may then be generated from the resulting data, now with much higher temporal resolution due to the increased data collection rate.

The shorter times afforded by the increased data collection rate allow for the collection of metric data and subsequent generation of output data that may be more indicative of limitations associated with operation of the communication interface. Many data transmissions are "bursty". For example, many packets may be queued up for transmission in a short time period, followed by a lull in transmission. As a result, during a short time interval, the communication interface may be in a saturated condition, such as sending data as quickly as possible in an attempt to clear the queue. These momentary "bursts" may be recorded by the metric data.

The output data may include information such as changes in percentile values for a particular network characteristic that exceeds a threshold value, a value based on the metric value such as a maximum, and so forth. The output data may be generated from the metric data using a variety of techniques. For example, the technique of binning, generating histogram data, creating comparison data, and so forth, as described above may be used. In other implementations, other techniques such linear analysis, regression analysis, curve fitting, and so forth, may be utilized. The output data may also include other information, such as a geolocation of the computing device at the time the metric data was acquired, application state data, and so forth. For example, the application state data may indicate an address of the external device, one or more environment variables of the application, and so forth.

Once acquired, the application executing on the computing device may use the output data to control operation. In one implementation, where the application is executing on a computing device using the Android Operating System (OS) as promulgated by Google, Inc., the output data may be used to set one or more selection nodes associated with execution of the application. A selection node comprises a portion of the instructions executed by the computing device at which point a decision may be made as to which subset of instructions are to be used from two or more sets of instructions. Selection nodes may be implemented by instructions executed on dedicated hardware, applications, operating systems, and so forth.

Any of the selection nodes within an application or operating system (OS) may be configured to use the metric data or the output data during operation. For example, a first user interface may include controls associated with use of a high bandwidth connection. A second user interface includes controls associated with use of a low bandwidth connection. A determination may be made if the available bandwidth as indicated by the output data is greater than a threshold amount. Based on this determination, a user interface selection node function may select the use of the first user interface. Selection node data provides information indicative of a particular selection that was made during operation of the application. In another example, the selection nodes may be used to determine a particular protocol to be used. In this example, the selection node may include instructions that change the application or the OS from using a first protocol to a second protocol. As the conditions of the network change, the output data provides information indicative of this change, and the selection nodes allow the application or the OS to change the protocols that are in use.

A developer of the application may use information based on one or more of the selection node data, the output data, or the metric data during the development process. For example, based on the selection node data, it may be determined that 80% of the time spent in the application involves a particular set of selections. Based on this information, the developers may focus their work on the application that involves that particular set of selections, allowing for more efficient use of development resources.

By using the techniques described herein, information about network characteristics or other aspects of operation of the computing device may be acquired and used to adapt the behavior of an application. With the application more responsive to the detected conditions of the underlying network connection(s), a better user experience during use of the application may be obtained. Also, operation of the application may be improved. For example, by modifying operation of the application, the amount of data sent by the network connection may be reduced, reducing power consumption of the computing device as well as reducing contention for bandwidth on the network connection.

FIG. 1 depicts a system 100 for adapting application behavior based on assessed network characteristics, according to one implementation. A user 102 may use a computing device 104. In some implementations, the computing device 104 may operate free from intervention of a user 102, such as an unattended camera, a sensor platform, an access point, a drone, and so forth.

The computing device 104 may be connected to a network 106. The network 106 may comprise a local area network (LAN), a wireless LAN (WLAN), a wireless wide area network (WWAN) such as a wireless cellular data network (WCDN), and so forth. In some implementations, the network 106 may comprise a personal area network (PAN), universal serial bus (USB) connection, and so forth. The computing device 104 may be wired or wirelessly connected to the network 106. The computing device 104 may have a communication interface configured to connect to the network 106. For example, the communication interface may include a radio to wirelessly communicate with a WCDN. While the following techniques are discussed with respect to operation using a WCDN, they may also be applied to other networks, such as a WLAN, WWAN, and so forth.

An application 108 may be executed at least in part on the computing device 104. In some implementations, the application 108 may send to or receive from network data 110 with one or more external devices 112 using the network 106. The external device 112 may store or retrieve information from a data store 114, such as a database or file system. For example, the application 108 may comprise a web browser application 108 that retrieves web pages from a web server by way of a WCDN, WLAN, and so forth. The network data 110 may comprise hypertext transfer protocol (HTTP) requests sent from the web browser application 108 to the web server and web page data sent to the web browser from the web server. The network data 110 may comprise data transferred to or from the computing device 104 during normal operation. In some implementations, the network data 110 may omit data used to test the communication interface, such as test data files, data including predetermined test patterns of data, and so forth. The external device 112 may comprise a server, another computing device 104, and so forth.

The application 108 may incorporate, be linked to, or be configured to access a software development kit (SDK) module 116. For example, at compile time, the SDK module 116 may be included into the compiled application 108. In other implementations, techniques other than an SDK module 116 may be used to provide the functionality described herein. For example, lines of computer code that provide the functionality of at least a portion of the SDK module 116 may be incorporated into the code base of the application 108.

The SDK module 116 may be configured to generate, acquire, or otherwise access metric data 118. The metric data 118 comprises information indicative of operation of the computing device 104. In some implementations, the metric data 118 may be indicative of one or more network characteristics. The network characteristics may include, but are not limited to, bandwidth, latency, number of packets sent, packet loss, transmit power, received signal strength, jitter, and so forth. The network characteristics may be indicative of operation of hardware, software, protocols, connection state, and so forth. In some implementations, the metric data 118 may comprise values produced by a counter. For example, a counter may be used to determine a count of packets sent per unit time. The value of the counter after a particular interval of time may be stored as the metric data 118.

The SDK module 116 may process the metric data 118 to generate output data 120. In some implementations, the metric data 118 may be binned. During binning, values are associated with a particular bin or interval of values. Histogram data may then be generated from the binned information. The histogram data may indicate a particular interval and a frequency or count of the number of values of metric data 118 that are within that particular interval. The histogram data may be further processed by the SDK module 116 to generate other information, such as percentile values, determine minimum value, maximum value, average value, mode, and so forth.

The SDK module 116 may generate comparison data by assessing changes in the metric data 118 from one time to another. For example, a change in percentile data from one time to another may be calculated. If the change exceeds a threshold value, the output data 120 may be generated indicative of an occurrence of an event. An event may be indicative of operation of the communication interface, a network connection that utilizes the communication interface, and so forth. For example, where the network characteristic is indicative of network latency, an increase in the $95^{th}$ percentile value from time=1 to time=2 that exceeds a threshold value of 200 milliseconds (ms) may result in output data 120 that is indicative of the event of a change in network latency. The output data 120 may comprise data indicative of one or more events in which the network latency changed or varied from a particular threshold. In some implementations, the output data 120 may be distributed using an event processing queue, event handling system, and so forth.

One or more of the application 108 or an operating system (OS) may include one or more selection modules 130. The selection module 130 is used to select or determine the instructions for further execution by a processor of the computing device 104. For example, the selection module 130 may comprise selectors as implemented in instructions processed using the Android OS as promulgated by Google, Inc. Based on the output data 120, a particular set of instructions may be selected for further execution. For example, the output data 120 may indicate that traffic using the network 106 has experienced a latency that exceeds a threshold value. As a result, the selection module 130 may use this output data 120 to direct operation of the application 108 to use a portion of the instructions that are associated with high latency. Continuing the example, the selection module 130 may select a first software module for execution rather than a second software module based on the information about the latency.

The selection module 130 is depicted and described as a separate module for ease of illustration and not necessarily as a limitation. The functionality of the selection module 130 and selection nodes (described below) may be incorporated into the SDK module 116, or other portions of the application 108.

Operation of the application 108 or other aspects of the computing device 104 may thus be adapted to adjust to changing conditions. As the output data 120 is generated that reflects the recent state of the network 106, the operation of the application 108 may be adjusted to better fit those conditions. For example, a user 102 who is using a network connection on a first network that has relatively high bandwidth but high latency may see a different user interface with different available controls while using the same application 108 with a second network.

In some implementations, the output data 120 or information based thereon may be provided to other services. For example, the output data 120 or information based thereon may be sent to one or more services, such as Google Analytics by Google Inc., Mixpanel.com by Mixpanel Inc. of San Francisco, Calif., and so forth. This data may be anonymized prior to transmission.

The output data 120 may be indicative of bandwidth, latency, number of packets sent, packet loss, transmit power, received signal strength, jitter, financial cost, and so forth. For example, the output data 120 may indicate that a network 106 is being used that assess a cost per megabyte to transfer data that exceeds a threshold value.

The computing device 104 may send at least a portion of the output data 120 to an analysis server 122. For example, an application developer may configure the SDK module 116 to send the output data 120 to the analysis server 122. The analysis server 122 may execute at least a portion of a report module 124. The report module 124 may process the output data 120 from one or more computing devices 104 and generate report data 126. For example, the report data 126 may comprise information about events involving the communication interface of computing devices 104 executing the application 108. In some implementations other data 128 may be generated as well by the analysis server 122.

In some implementations, selection node data 132 may be generated. This information may be sent to the analysis server 122 for subsequent use. The selection node data 132 comprises information indicative of the operation of the application 108 with regard to a particular path through a network of the selection nodes. For example, the selection node data 132 may comprise information indicative of an order of traversal of the various decision nodes and the selection made at each. In another example, the selection node data 132 may comprise information indicative of one or more of the final set of instruction executed, final selection node 202, last selection made by the final selection node 202, and so forth. The selection node data 132 may thus provide information about the selections that were made. Selection nodes 202 are discussed below with respect to FIG. 2.

The analysis server 122 may aggregate information from a plurality of computing devices 104, applications 108, and so forth. For example, the selection node data 132 may be used to generate information indicative of use of the application 108 by one or more different users 102. The analysis server 122 may generate aggregate information based on location at time of operation, user 102, type of computing device 104, network 106 used, and so forth. For example, the analysis server 122 may generate data based on the selection node data 132 for a particular application 108 for users 102 in a particular geographic location.

The analysis server 122 may analyze the output data 120, selection node data 132, and so forth to generate report data 126 indicative of a distribution of co-occurrences. For example, a particular category of user 102 is associated with this particular set of decisions in the selection nodes. Probabilistic models of behavior of the application 108 may be developed using the output data 120. In some implementations these probabilistic models may include a Markov model.

In some implementations, report data 126 may be indicative of the particular transitions from one selection node 202 to another. For example, the report data 126 may indicate that when the application 108 executes in a particular geographic location, it more frequently transitions from a poor network to good network set of selection nodes 202.

The report data 126 may comprise a graphical depiction. For example, a chart may depict a summary of the selection node data 132 for a particular group of users 102. The application developer, computing device administrator, network administrator, or other entity may use the report data 126 for various purposes. The application developer may use the report data 126 to determine what aspects of the application 108 could be improved to enhance user experience. For example, particular selection nodes 202 that are not used may be removed, heavily used selection nodes 202 may be optimized, and so forth.

An external device 112, such as the application server, may use one or more of the output data 120, the selection node data 132, node setting data 134 (described below), or other information during operation. For example, the application server 112 may use the selection node data 132 to determine a previous path through selection nodes and predict a future path. Based on this information, the application server 112 may present different content, utilize different communication protocols, send instructions to the application 108 on the computing device 104 to affect operation of the application 108, and so forth. For example, based on selection node data 132 indicating that the application 108 is trying to adapt to a poor network connection, the application server 112 may reduce the amount of data transferred, utilize data compression, and so forth.

The analysis server 122 may also use one or more of the output data 120, selection node data 132, and so forth to determine an actual or potential compromise to information security of the computing device 104, the external device 112, or other devices. For example, selection node data 132 indicative of traversal of a set of low-reliability selection nodes and the execution of the instructions corresponding to each on a device and network that have previously been characterized as using high-reliability selection nodes may be indicative of a potential breach, such as a man-in-the-middle attack.

Figure 2:
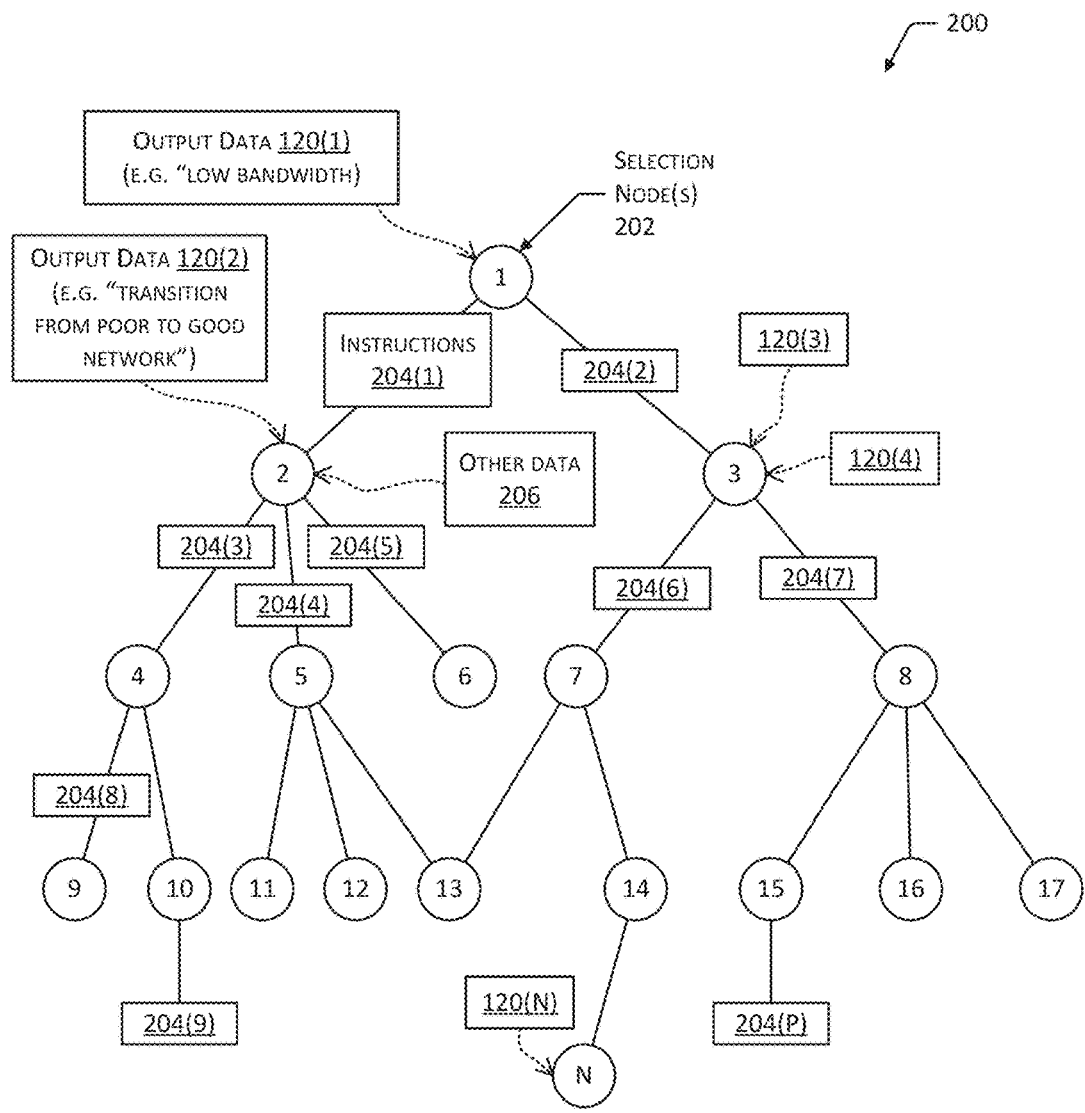
FIG. 2 depicts a schematic of selection nodes that may be used to select particular sets of instructions for execution based on output data, according to one implementation.

FIG. 2 depicts a schematic 200 of selection nodes 202(1), 202(2), . . . , 202(N) that may be used to select particular sets of instructions 204(1), 204(2), . . . , 204(P) for execution based on output data 120, according to one implementation. The instructions 204 may comprise executable code, scripts, modules, network addresses, uniform resource locators (URLs), and so forth. Each selection node 202 may direct operation of the application 108 to a particular set of instructions 204 within or associated with the application 108. For example, the selection node 202 may comprise an "IF-THEN" statement in the executable code of the application 108.

In one implementation, the selection node 202 may offer a choice between a first set of instructions and a second set of instructions. For example, the first set of instructions may comprise instructions to present a first user interface having a first element with a first characteristic value that exceeds a threshold value while the second set of instructions comprise instructions to present a second user interface having a second element with a second characteristic value that is less than or equal to the threshold value. Continuing the example, the first element may comprise a first image and the first characteristic value may comprise a file size of that first image. Likewise, the second element may comprise a second image and the second characteristic value may comprise a file size of that second image. Continuing the example, the selection node 202 may be configured to take action such that when the network transitions from a good to poor connection that images below a particular size threshold are retrieved.

The selection nodes 202 may utilize one or more characteristic values to present a particular user interface or portion thereof. These characteristic values may include, but are not limited to, number of bits of the element to transfer using the communication interface, estimated time to transfer the element using the communication interface, actual time to transfer the element using the communication interface, financial cost to transfer the element using the communication interface, resolution of the element, and so forth. The number of bits of the element to transfer may be indicative of a size of the data associated with the element, such as a file size, image size, frame size, and so forth. The estimated time to transfer the element may use metric data to estimate how much time will be needed given past, current, or predicted performance of the connection provided by the communication interface. The actual time to transfer the element using the communication interface may be determined based on previous transfer times for the same element or a similar element, under the same or similar network conditions. The financial cost to transfer the element may comprise information indicative of a cost to transfer the element using a WCDN or a WLAN. The resolution of the element provides information such as a sampling or other resolution that is used to represent the element. For example, an image may have a characteristic value that is expressed as a horizontal number of pixels, a vertical number of pixels, and a color depth. In another example, audio data may have a characteristic value such as a number of samples per second and a bit depth for each sample.

The selection nodes 202 may be used to select from a plurality of protocols such as application protocols, transport protocols, and so forth. For example, as network conditions change, the application 108 may transition from using a first application protocol to using a second application protocol to communicate with an external device 112 via the network 106. For example, the protocols utilized by the application at a first time may include transmission control protocol (TCP), transport layer security (TLS), and hypertext transport protocol (HTTP). However, if the throughput of the connection provided by the communication interface decreases, the application may transition at a second time to utilize user datagram protocol (UDP) and Quick UDP Internet Connection (QUIC). This combination of protocols used at the second time may provide for improved performance in the situation where network throughput has decreased.

In another example, the application 108 may disallow use of any application protocol or other protocol until previously specified conditions are determined as being present. For example, a connection utilizing TCP, TLS, and HTTP may be disallowed until the output data 120 meets or exceeds predetermined threshold values.

The selection node 202 may utilize one or more inputs, including but not limited to the output data 120 or other data 206. For example, the selection node 202 for selection between a high resolution and a low resolution user interface may use output data 120 indicative of available bandwidth as well as other data 206, such as a user preference setting, to make a selection. The other data 206 may include other information such as information indicative of a geolocation, settings associated with a particular location, localization settings, and so forth. For example, the localization settings may include information such as language preferences, dialect preferences, regional preferences, and so forth.

During operation, the application 108 may traverse this selection tree, utilizing different code libraries, modules, and so forth. By using the output data 120, the application 108 is better able to adapt to the changing conditions of the network 106, providing a better user experience.

By adapting operation of the application 108 responsive to the output data 120, overall performance of the computing device 104 and user satisfaction may be improved. For example, by adjusting the application 108 to transfer less data when on a roaming WCDN, the financial costs to the user 102 may be minimized. In another example, by adjusting a user interface to omit or deactivate functions of the application 108 that cannot be offered with a minimum level of performance, frustration of the user 102 may be prevented.

Output data 120, or events indicative thereof, may be distributed through the application 108, to other applications 108 executing on the computing device 104, and so forth. In one implementation, the OS may generate the output data 120.

In some implementations, one or more of the output data 120 or other data 206 may be previously generated and provided to the selection nodes 202. During testing of an application, predefined values of output data 120 or other data 206 may be provided as input to the selection nodes 202 to provide particular timing. For example, during testing of an application that is to be used in India, the system described in U.S. patent application Ser. No. 14/850,798 filed Sep. 10, 2015, and titled "System for Application Test" may be used to provide for remote access to proxy access devices in India. Some of the output data 120 may be simulated or retrieved from prior storage to generate particular selections for instructions 204 by the selection nodes 202. This testing may be done pre-launch of the application 108, such as during initial development phases, or may be done using an application 108 that is deployed. In some implementations, the one or more of the output data 120 or other data 206 may be modified or changed during testing or operation of the application 108. For example, output data 120 indicative of packet jitter may be changed from the actual value experienced by a proxy access device to another value to facilitate testing under particular conditions.

In some implementations, the previously generated data such as the output data 120 or other data 206 may be delivered to the application 108 using a dedicated communication pathway or backchannel. During operation of the application 108, one or more of the selection modules 130 may receive one or more of output data 120 or other data 206 that is at least partially based on metric data from the SDK module 116 and at least partially from information that is previously stored or synthesized. In some implementations, the previously stored information may be a replay of a previously replayed session.

In some implementations, the configuration of the selection nodes 202 and the instructions 204 may vary. For example, a pathway from the selection node 202(2) to the selection node 202(6) may be discontinued and a new pathway from the selection node 202(2) to selection node 202(7) may be established.

The selection module 130 may comprise one or more of the selection nodes 202 as described above, or may operate in conjunction with the selection nodes. As described in one implementation above, the instructions providing functionality of the selection module 130 may be distributed throughout an application 108, OS, and so forth. In another implementation, the selection module 130 may be generate node setting data 134. The node setting data 134 may be used to configure the selection node 202. For example, the node setting data 134 may provide pre-defined data that is used to specify how a particular selection node 202 is to operate. For example, the node setting data 134 may specify that node 202(2) is to operate in the fashion associated with a transition from a poor network connection to a good network connection. In the implementations where the node setting data 134 is utilized, the selection node 202 may thus be designed to be responsive to the node setting data 134, instead of or in addition to the output data 120. For example, the selection module 130 may utilize the output data 120 to generate the node setting data 134. The node setting data 134 may then be used by the selection node 202 to implement a particular configuration of the selection node 202.

The external device 112, such as the application server, may use one or more of the output data 120, the selection node data 132, node setting data 134, or other information during operation. For example, the application server 112 may use the node setting data 134 to determine the path through selection nodes 202 that the application 108 is expected to follow. Based on this information, the application server 112 may pre-generate content, cache content, setup to use different communication protocols, send instructions to the application 108 on the computing device 104 to affect operation of the application 108, and so forth. For example, based on node setting data 134 indicating that the application 108 is trying to adapt to a poor network connection, the application server 112 may pre-generate and cache lower resolution images.

The node setting data 134 may be provided to the analysis server 122 for processing. Instead of, or in addition to the selection node data 132, the analysis server 122 may use the node setting data 134 to determine the report data 126. In some implementations, the selection node data 132 may be compared with the node setting data 134. For example, the comparison may provide insights as to how the predicted traversal of the selection nodes 202 varied from the actual traversal. These insights may be used to determine deviations in operation, malfunctions of selection nodes 202, determine selection nodes 202 that should be optimized, and so forth.

Figure 3:
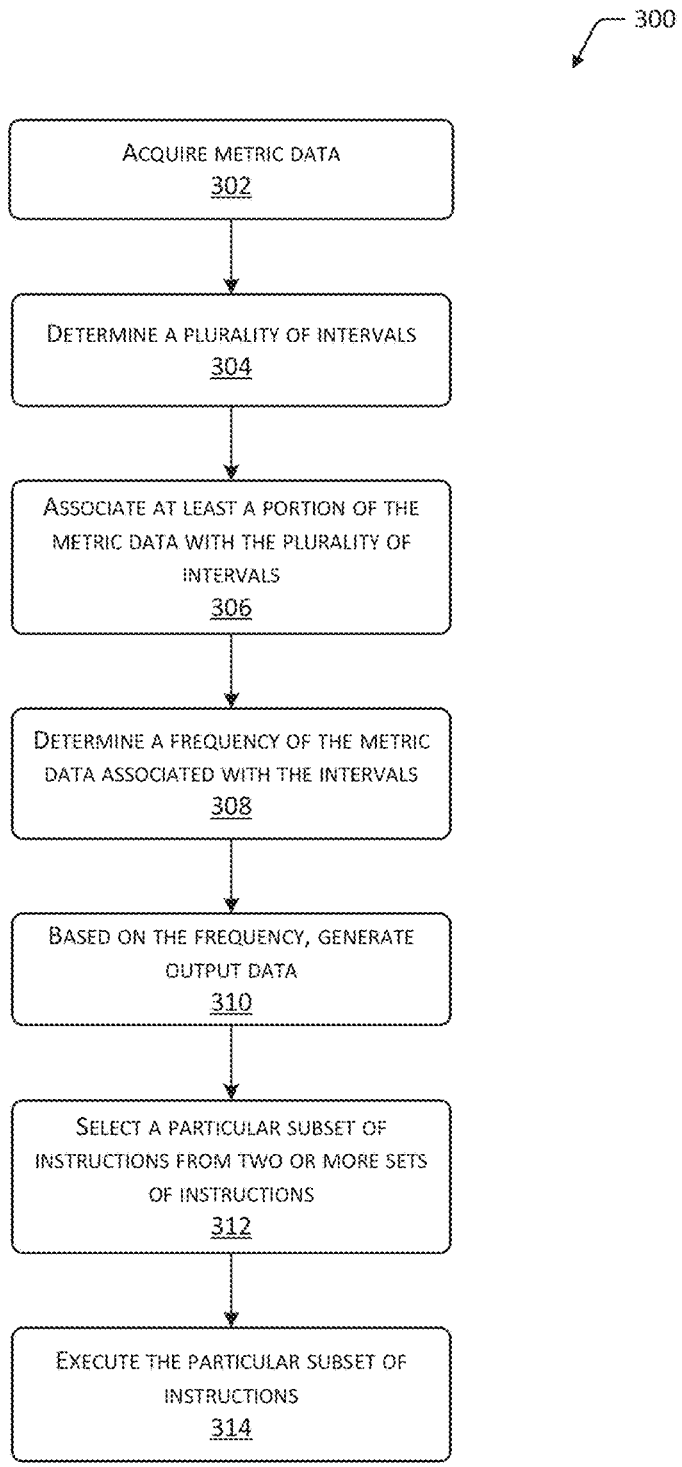
FIG. 3 depicts a flow diagram of a dynamic execution of instructions responsive to the output data, according to some implementations.

FIG. 3 depicts a flow diagram 300 of a dynamic execution of instructions responsive to the output data 120, according to some implementations.

At 302 metric data 118 is acquired. For example, the metric data 118 may be obtained from the communication interface of the computing device 104, from the operating system, and so forth. As described above, the metric data 118 may be obtained as a first data collection rate.

At 304 a plurality of intervals are determined. In one implementation, each interval may extend from a first endpoint to a second endpoint. The endpoints may be indicative of a value of time, sequence number, and so forth. Each interval may thus describe a "bucket" or "bin".

At 306 at least a portion of the metric data 118 is associated with one or more of the plurality of intervals. For example, the metric data 118 occurring between the first and second endpoints of a particular interval may be associated with that interval.

At 308 a frequency of the metric data 118 associated with each of the intervals is determined for at least a portion of the plurality of intervals. For example, the frequency of occurrence of the metric data 118 within a first interval may be calculated. As described above, the metric data 118 may be associated with operation of the communication interface.

At 310 output data 120 may be generated. The output data 120 may be determined based on the frequency. In some implementations the output data 120 may also be generated based at least in part on other data, such as information indicative of geolocation, one or more localization settings, and so forth. For example, the output data 120 may include information such as the geolocation of the computing device 104 that corresponds with the metric data 118. In another example, the output data 120 may include information about localization settings including one or more of language preference, dialect preference, regional preference, and so forth. For example, the output data 120 may include information about the language the user 102 has set as a preference on the computing device 104.

At 312 one or more instructions are selected based on the output data 120. For example, a particular subset of instructions may be selected from two or more sets of instructions in a particular selection node 202. These instructions may be associated with controlling operation of the communication interface, a connection, presentation of a user interface, operation of the computing device 104, and so forth.

At 314 the particular subset of instructions are executed. For example, responsive to the output data 120 indicating that the network bandwidth has decreased below a threshold value, the application 108 may transition to present a different user interface that is appropriate to a connection with limited available bandwidth. In another example, responsive to the output data 120, the instructions may transition the application 108 from using a first application protocol to a second application protocol. For example, the output data 120 may indicate that the connection has transitioned from using a WiFi network to using a WCDN. Based on this output data 120, the selection nodes 202 may transition the computing device 104 from using a combination of TCP, TLS, and HTTP to using a combination of UDP and QUIC. In another example, availability of a non-internet protocol (IP) based protocol, such as Bluetooth, may result in the computing device 104 changing protocols to utilize this non-IP connection. As described above, the particular subset of instructions may be executed on the computing device 104, an external device 112, or another device.

In some implementations other actions may be taken. For example, node setting data 134 may be generated by the selection module 130 and provided to another device. Continuing the example, the computing device 104 may comprise a smartphone that is providing network connectivity to an external device 112 such as a laptop, wearable device, vehicle, and so forth. The computing device 104 may use the selection module 130 to determine node setting data 134 which is then provided to the external device 112. Subsequently, the external device 112 operates the selection nodes 202 executing thereon in accordance with the node setting data 134.

Figure 4:
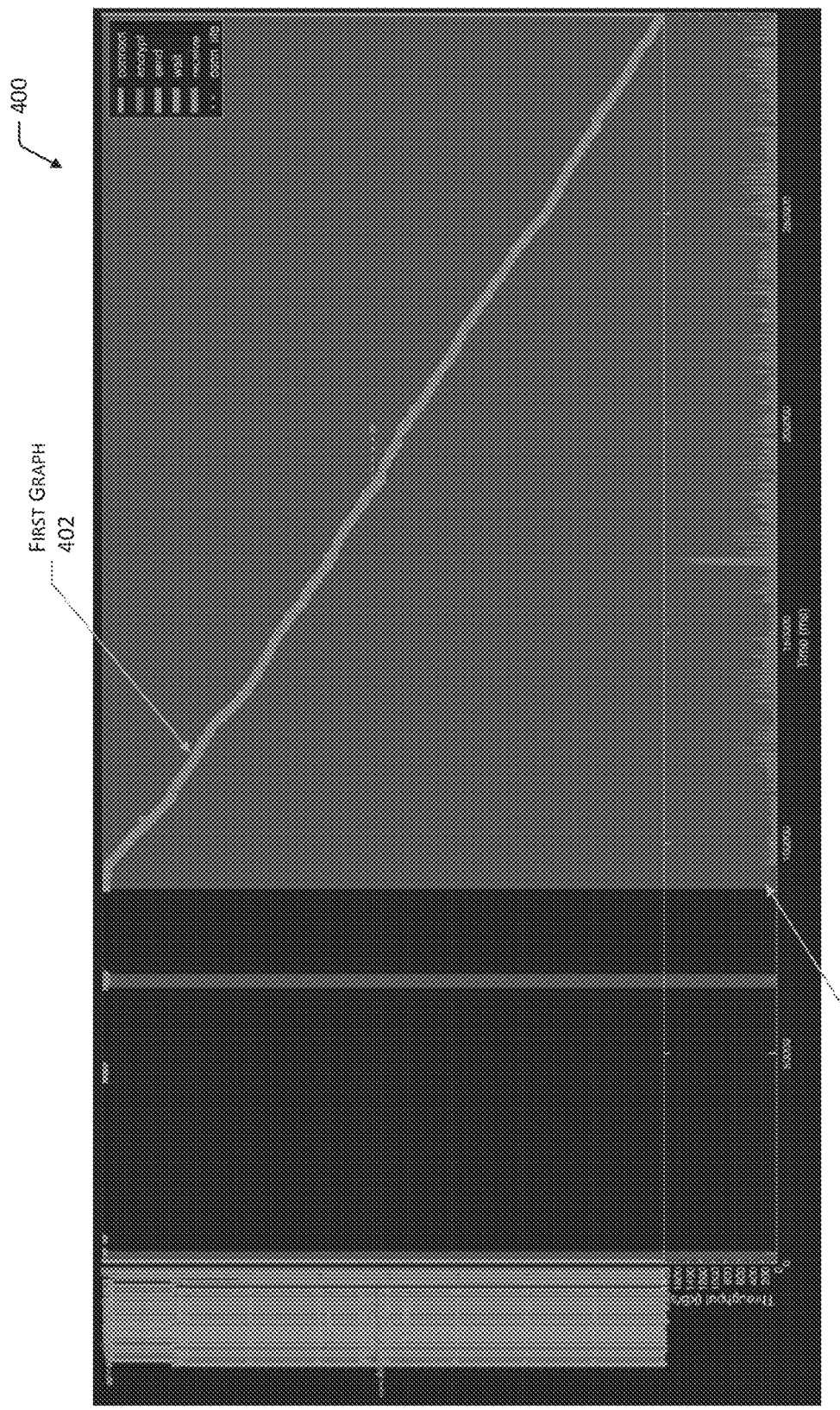
FIG. 4 depicts an example of report data based on output data, according to one implementation. For example, throughput in kilobytes per second is indicated as a bar graph over time while other metrics are plotted as well.

FIG. 4 depicts an example of report data 126 based on output data 120, according to one implementation. In some implementations, at least a portion of the report data 126 may be used to generate a visualization. For example, as shown here a horizontal axis indicates elapsed time during testing. A first graph 402 presents information about the communication over time between the computing device 104 and one or more external devices 112, such as web servers. For example, the first graph 402 may comprise information about network data 110 and metric data 118. A second graph 404 presents information about the throughput in kilobytes per second (kB/s) at various intervals of time.

In some implementations, the output data 120 may be used to modify operation of a service or other application executing on the external device 112(1) or other computing device. The server may be in communication with the computing device 104. For example, based on the output data 120, a service executing on the external device 112(1) may implement a selection module 130 that changes operation of the service based on one or more of the output data 120 or the node setting data 134.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a communication interface;
one or more memories storing computer-executable instructions; and
one or more hardware processors to:
   acquire, at a first data collection rate, metric data associated with operation of the communication interface;
   determine a plurality of intervals, each interval extending from a first endpoint to a second endpoint and includes the metric data acquired at the first data collection rate;
   associate at least a portion of the metric data acquired at the first data collection rate with each of the plurality of intervals;
   determine, for at least a portion of the plurality of intervals, a frequency of the metric data associated with each of the intervals;
   determine comparison data indicative of a difference between a first frequency associated with the metric data for a first interval of the plurality of intervals and a second frequency associated with the metric data for a second interval of the plurality of intervals that exceeds a frequency threshold;
   based on the difference exceeding the frequency threshold, generate output data associated with the operation of the communication interface;
   select, based on the output data, a particular subset of instructions from two or more sets of instructions to transition to a second data collection rate, the second data collection rate being different than the first collection rate; and
   execute the particular subset of instructions to transition to the second data collection rate.

2. The device of claim 1, wherein the metric data is indicative of one or more of:
bandwidth,
latency, number of packets sent,
packet loss,
transmit power,
received signal strength,
jitter, or
financial cost.

3. The device of claim 1, the two or more sets of instructions comprising a first set of instructions and a second set of instructions, the first set of instructions comprising instructions to present a first user interface having a first element with a first characteristic value that exceeds a threshold value; and
the second set of instructions comprising instructions to present a second user interface having a second element with a second characteristic value that is less than or equal to the threshold value.

4. The device of claim 3, wherein the characteristic value of one or more of the first element or the second element is indicative of one or more of:
number of bits of the element to transfer using the communication interface,
estimated time to transfer the element using the communication interface,
actual time to transfer the element using the communication interface,
financial cost to transfer the element using the communication interface, or
resolution of the element.

5. The system of claim 1, the computer-executable instructions to generate the output data further comprising computer-executable instructions to:
determine a percentile value from the plurality of intervals;
determine a change in the percentile value from a first time to a second time;
determine the change exceeds a threshold change value; and
generate the output data indicative of occurrence of an event.

6. The device of claim 1, wherein the communication interface establishes a connection with a wireless cellular data network and further wherein the metric data is indicative of the connection.

7. A method comprising:
acquiring, at a first data collection rate, metric data associated with operation of a communication interface;
determining a plurality of intervals;
associating at least a portion of the metric data acquired at the first data collection rate with each of the plurality of intervals;
determining, for one or more of the plurality of intervals, a frequency of the metric data associated with the plurality of intervals;
determining comparison data indicative of a difference between a first frequency associated with the metric data for a first interval of the plurality of intervals and a second frequency associated with the metric data for a second interval of the plurality of intervals that exceeds a frequency threshold;
based on the difference exceeding the frequency threshold, generating output data associated with the operation of the communication interface;
selecting, based on the output data, a particular subset of instructions from two or more sets of instructions to transition to a second data collection rate, the second data collection rate being different than the first collection rate; and transitioning to the second data collection rate.

8. The method of claim 7, wherein the metric data is indicative of one or more of:
bandwidth,
latency,
number of packets sent,
packet loss,
transmit power,
received signal strength,
jitter, or
financial cost.

9. The method of claim 7, wherein the metric data is indicative of a particular connection that utilizes the communication interface, wherein the particular connection is between a first computing device and an external device.

10. The method of claim 7, further comprising:
executing the particular subset of instructions.

11. The method of claim 7, further comprising:
generating data indicative of the selecting that designates the particular subset of instructions.

12. The method of claim 11, further comprising:
sending the data that designates the particular subset of instructions to a computing device; and
operating the computing device based at least in part on the data that designates the particular subset of instructions.

13. The method of claim 7, the generating the output data further comprising:
determining a percentile value from a plurality of frequencies of the at least a portion of the plurality of intervals;
determining a change in the percentile value from a first time to a second time; and
determining the change exceeds a threshold change value.

14. A method comprising:
acquiring, at a first data collection rate, metric data associated with operation of a communication interface;
determining, for one or more of a plurality of intervals, a frequency of the metric data acquired at the first data collection rate associated with each of the plurality of intervals;
determining comparison data indicative of a difference between a first frequency associated with the metric data for a first interval of the plurality of intervals and a second frequency associated with the metric data for a second interval of the plurality of intervals that exceeds a frequency threshold;
based on the difference exceeding the frequency threshold, generating output data associated with the operation of the communication interface;
selecting, based on the output data, a particular instruction to transition to a second data collection rate, the second data collection rate being different than the first collection rate; and
transitioning to the second data collection rate.

15. The method of claim 14, wherein the generating the output data is based at least in part on information indicative of a geolocation.

16. The method of claim 14, wherein the generating the output data is based at least in part on one or more localization settings indicative of one or more of language preference, dialect preference, or regional preference.

17. The method of claim 14, further comprising:
changing a computing device from utilizing a first protocol to a second protocol, responsive to the particular instruction.

18. The method of claim 14, further comprising:
generating data indicative of the selecting that designates the particular instruction.

19. The method of claim 18, further comprising:
sending the data that designates the particular instruction to a computing device; and
operating the computing device based at least in part on the data that designates the particular instruction.

20. The method of claim 14, the generating the output data further comprising:
determining a percentile value from a plurality of the frequencies of the at least a portion of the plurality of intervals;
determining a change in the percentile value from a first time to a second time; and
determining the change exceeds a threshold change value.

* * * * *

UNITED STATES PATENT AND TRADEMARK OFFICE
CERTIFICATE OF CORRECTION

PATENT NO. : 10,178,569 B1
APPLICATION NO. : 15/439755
DATED : January 8, 2019
INVENTOR(S) : Brien Colwell and Manish Lachwani It is certified that error appears in the above-identified patent and that said Letters Patent is hereby corrected as shown below:

On the Title Page

Item (56), References Cited:
U.S. Patent Pub. No. 2007/0094356 ("Sethi") is missing In the Claims Column 14, Lines 60-61:
Reads "first collection rate"
When it should read "first data collection rate"

Column 16, Lines 1-2:
Reads "first collection rate"
When it should read "first data collection rate"

Column 16, Lines 58-59:
Reads "first collection rate"
When it should read "first data collection rate"

Signed and Sealed this
Twenty-sixth Day of March, 2019

Andrei Iancu
*Director of the United States Patent and Trademark Office*